US010605296B2

(12) United States Patent
Lor et al.

(10) Patent No.: US 10,605,296 B2
(45) Date of Patent: Mar. 31, 2020

(54) FASTENING DEVICE

(71) Applicant: Hilti Aktiengesellschaft, Schaan (LI)

(72) Inventors: Ferenc Lor, Buchs (CH); Zsolt Schaller, Schaan (LI); Markus Frommelt, Schaan (LI)

(73) Assignee: HILTI AKTIENGESELLSCHAFT, Schaan (LI)

( * ) Notice: Subject to any disclaimer, the term of this patent is extended or adjusted under 35 U.S.C. 154(b) by 257 days.

(21) Appl. No.: 15/104,575

(22) PCT Filed: Dec. 16, 2014

(86) PCT No.: PCT/EP2014/077959
§ 371 (c)(1),
(2) Date: Jun. 15, 2016

(87) PCT Pub. No.: WO2015/091479
PCT Pub. Date: Jun. 25, 2015

(65) Prior Publication Data
US 2016/0312820 A1    Oct. 27, 2016

(30) Foreign Application Priority Data
Dec. 19, 2013   (EP) .................................... 13198445

(51) Int. Cl.
*F16B 43/00* (2006.01)
*F16B 19/14* (2006.01)
(Continued)

(52) U.S. Cl.
CPC .............. *F16B 43/001* (2013.01); *F16B 5/02* (2013.01); *F16B 19/008* (2013.01); *F16B 19/02* (2013.01); *F16B 19/14* (2013.01); *F16B 33/004* (2013.01)

(58) Field of Classification Search
CPC ....... F16B 43/001; F16B 33/004; F16B 19/14
(Continued)

(56) References Cited

U.S. PATENT DOCUMENTS

| 436,775 A | * | 9/1890 | Corley | .................. F16B 43/001 411/371.1 |
| 951,437 A | * | 3/1910 | Gehrke | ................ B65D 39/084 220/304 |

(Continued)

FOREIGN PATENT DOCUMENTS

| CA | 644 779 A | 7/1962 |
| DE | 20 2006 000666 U1 | 3/2006 |

(Continued)

OTHER PUBLICATIONS

Japanese Patent Office, Office Action in counterpart Japanese Application No. 2016-540962, dated Feb. 28, 2018.
(Continued)

*Primary Examiner* — Flemming Saether
(74) *Attorney, Agent, or Firm* — Leydig Voit & Mayer, Ltd.

(57) ABSTRACT

The invention relates to a device for fastening a first object to a second object, said device comprising a first load section having a first load-engaging means, a driving section defining a driving direction and a sealing element for creating a seal between the device and the second object, the sealing element having a width perpendicular to the driving direction and a height in the driving direction.

18 Claims, 3 Drawing Sheets

Figure 1:
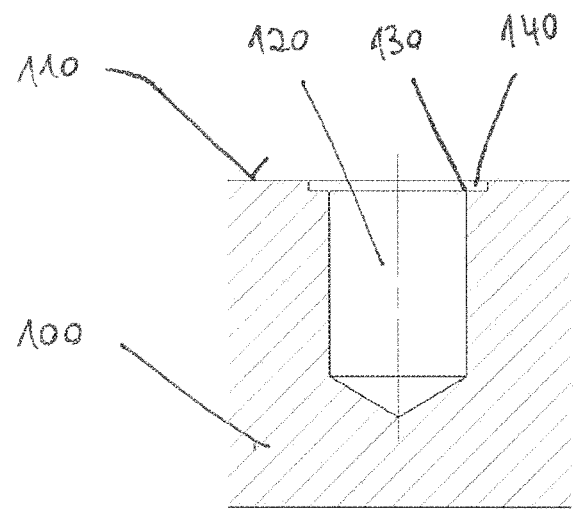

(51) Int. Cl.
*F16B 19/00* (2006.01)
*F16B 5/02* (2006.01)
*F16B 19/02* (2006.01)
*F16B 33/00* (2006.01)

(58) Field of Classification Search
USPC ..... 411/369, 371.1, 542, 400, 401, 388, 389
See application file for complete search history.

(56) References Cited

U.S. PATENT DOCUMENTS

| | | | | |
|---|---|---|---|---|
| 2,053,918 | A * | 9/1936 | Peretsman | F28F 11/04 |
| | | | | 138/98 |
| 2,723,048 | A * | 11/1955 | Welch | F16B 43/001 |
| | | | | 220/681 |
| 3,299,766 | A * | 1/1967 | Gould | F16B 43/001 |
| | | | | 411/371.1 |
| 5,388,941 | A * | 2/1995 | Wuenscher | B62D 5/061 |
| | | | | 411/303 |
| 5,979,944 | A * | 11/1999 | Yokoyama | F15B 13/0817 |
| | | | | 285/124.3 |
| 6,582,172 | B2 * | 6/2003 | Nickerson | F16B 5/02 |
| | | | | 277/598 |
| 6,676,345 | B2 * | 1/2004 | Szczukowski | F16B 5/0241 |
| | | | | 411/533 |
| 7,624,618 | B2 * | 12/2009 | Bader | F01M 11/0408 |
| | | | | 116/104 |
| 7,980,801 | B2 * | 7/2011 | Kawano | F16B 23/00 |
| | | | | 411/399 |
| 8,517,654 | B2 * | 8/2013 | Buhri | F16B 19/14 |
| | | | | 411/424 |
| 9,423,060 | B2 * | 8/2016 | Shinohara | F16B 5/0241 |
| 9,689,418 | B2 * | 6/2017 | Schumacher | F16B 31/02 |
| 2004/0105735 | A1 | 6/2004 | Favre-Bulle et al. | |
| 2010/0111640 | A1 | 5/2010 | Buhri et al. | |
| 2011/0226094 | A1 | 9/2011 | Stahel et al. | |
| 2014/0314521 | A1 | 10/2014 | Lor et al. | |

FOREIGN PATENT DOCUMENTS

| | | |
|---|---|---|
| DE | 10 2007 043283 A1 | 3/2009 |
| DE | 10-2010 003 130 A1 | 9/2011 |
| EP | 2 372 174 A2 | 10/2011 |
| JP | S48-14938 A | 2/1973 |
| JP | S60-7459 U1 | 1/1985 |
| JP | H04-052610 U | 5/1992 |
| JP | 2010-112556 A | 5/2010 |
| WO | WO 2013/045130 A1 | 4/2013 |

OTHER PUBLICATIONS

Japanese Patent Office, Japanese Office Action in counterpart Japanese application No. 2016-540962, dated Jun. 7, 2017.
International Bureau, International Search Report in International Patent Application No. PCT/EP2014/077959, dated Mar. 30, 2015.
European Patent Office, European Search Report in European Patent Application No. 13198445.2, dated May 12, 2014.

* cited by examiner

FASTENING DEVICE

CROSS-REFERENCE TO RELATED APPLICATIONS

This patent application is the U.S. National Stage of International Patent Application No. PCT/EP2014/077959, filed Dec. 16, 2014, which claims the benefit of European Patent Application No. 13198445.2, filed Dec. 19, 2013, which are each incorporated by reference.

TECHNICAL FIELD

The invention relates to a method for fastening a first object to a second object.

BACKGROUND OF THE INVENTION

Such a fastening device is described in DE 10 2010 003 130 A1. The fastening device has an expansion sleeve and an expanding mandrel, wherein the sleeve has a first load-engagement means for the first object and an abutment for an outer surface of the second object. A sealing element is arranged adjacent to the abutment.

With such fastening devices there is a danger that if the driving depth is too low, the sealing element may not be sufficiently compressed to guarantee its sealing function. There is also the danger that the sealing element may be pressed too strongly if the driving depth is too large and will protrude radially outward. The tolerance for the driving depth is therefore limited.

The problem addressed by the invention is that of providing a device with which the sealing function of the sealing element is guaranteed within a wide tolerance for the driving depth, without the sealing element excessively protruding radially when compressed.

BRIEF SUMMARY OF THE INVENTION

The problem is solved by a device for fastening a first object to a second object, comprising a load section having a first load engagement means, a driving section defining a driving direction, and a sealing element for sealing between the device and the second object, wherein the sealing element has a width b perpendicular to the driving direction and a height h in the driving direction that is greater than the width b. Preferably, $h > 1.1 \times b$, more preferably $h > 1.5 \times b$ and especially preferably $h > 1.8 \times b$. In comparison to previously known devices, a greater height of the sealing element is achieved for the same volume and therefore the sealing element is compressed sufficiently even if there are large fluctuations in the driving depth.

According to one advantageous embodiment, the sealing element comprises a sealing ring with an outer diameter D and an inner diameter d. The width b preferably corresponds to the difference between the outer diameter D and the inner diameter d. The ring is especially preferably circular. The outer diameter D is preferably less than or equal to a largest diameter of the load section, especially preferably that of the first load engagement means, and therefore the sealing ring does not protrude radially outward. It is likewise preferred that the sealing ring protrudes radially relative to the load section, particularly the first load engagement means, by at most 15%, more preferably at most 7.5%, and especially preferably at most 3%. It is likewise preferred that the sealing ring protrudes radially relative to the load section, particularly the first load engagement means, by at most 0.5 mm, more preferably at most 0.25 mm, and especially preferably at most 0.1 mm. The inner diameter d is preferably less than or equal to a largest diameter of the driving section, so that the sealing ring contacts the driving section radially inwardly, whereby the sealing function is improved under certain circumstances.

According to an advantageous embodiment, a cross-sectional surface of the sealing element is rectangular. According to another advantageous embodiment, a cross-sectional surface of the sealing element is oval or elliptical.

According to an advantageous embodiment, the fastening device comprises a sealing surface facing in the driving direction, against which the sealing element rests. The fastening device preferably comprises a sealing flange bearing the sealing surface.

According to an advantageous embodiment, the load section comprises a shank and a sleeve that bears the first load engagement means. The sleeve also bears the sealing surface, especially preferably the flange. The first load engagement means preferably comprises a thread.

According to an advantageous embodiment, the driving section comprises a shank. The driving section preferably comprises a nail tip. According to another advantageous embodiment, the driving section comprises a screw thread. The driving section preferably comprises a screw tip or drill bit. According to another advantageous embodiment, the driving section comprises an expansion sleeve and an expanding mandrel.

BRIEF DESCRIPTION OF THE SEVERAL VIEWS OF THE DRAWING(S)

Figure 2:
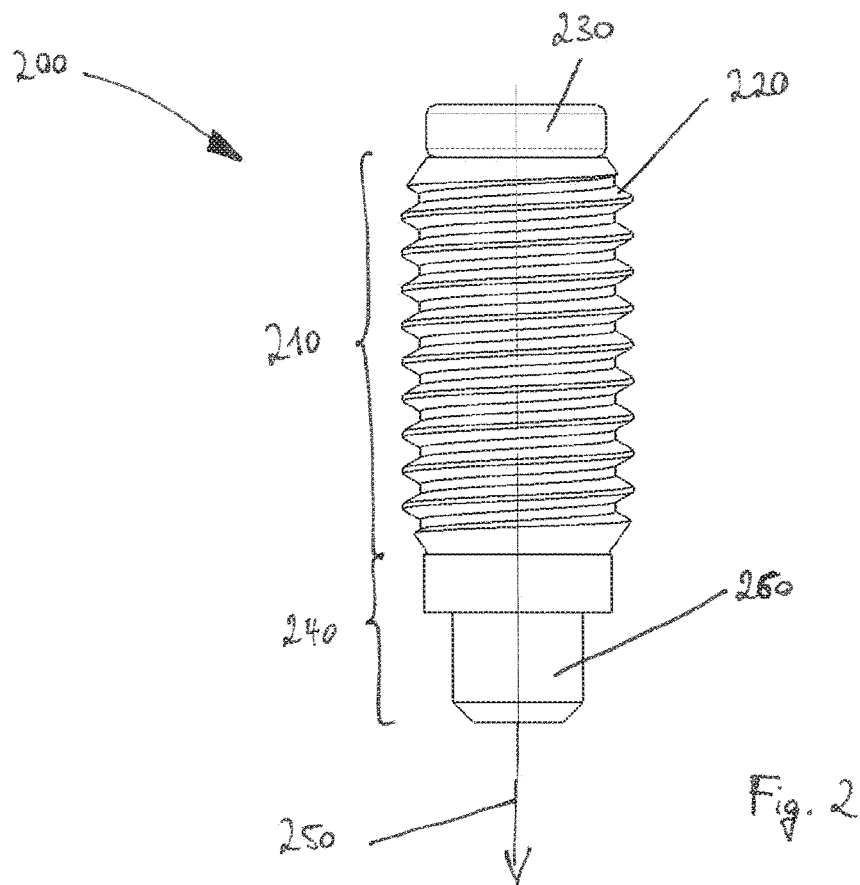
Figure 3:
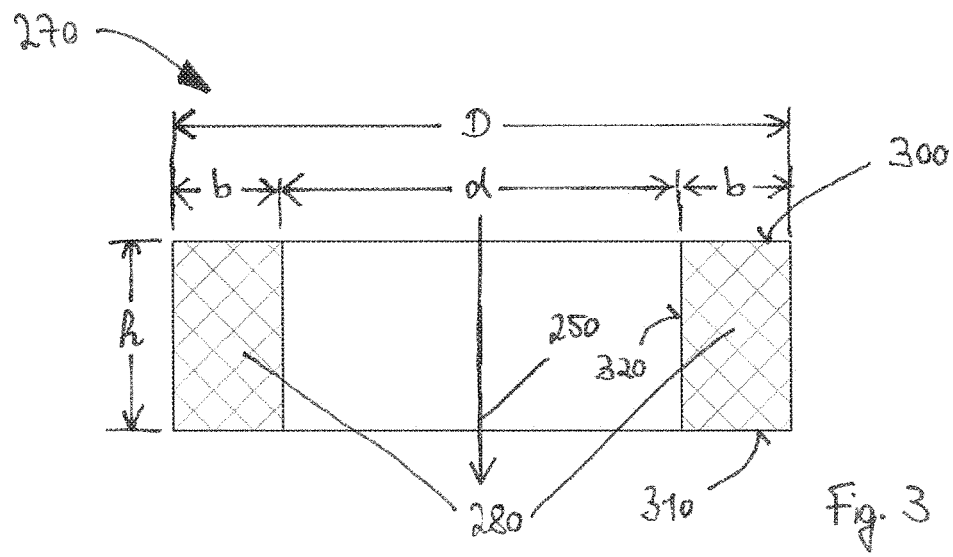
Figure 4:
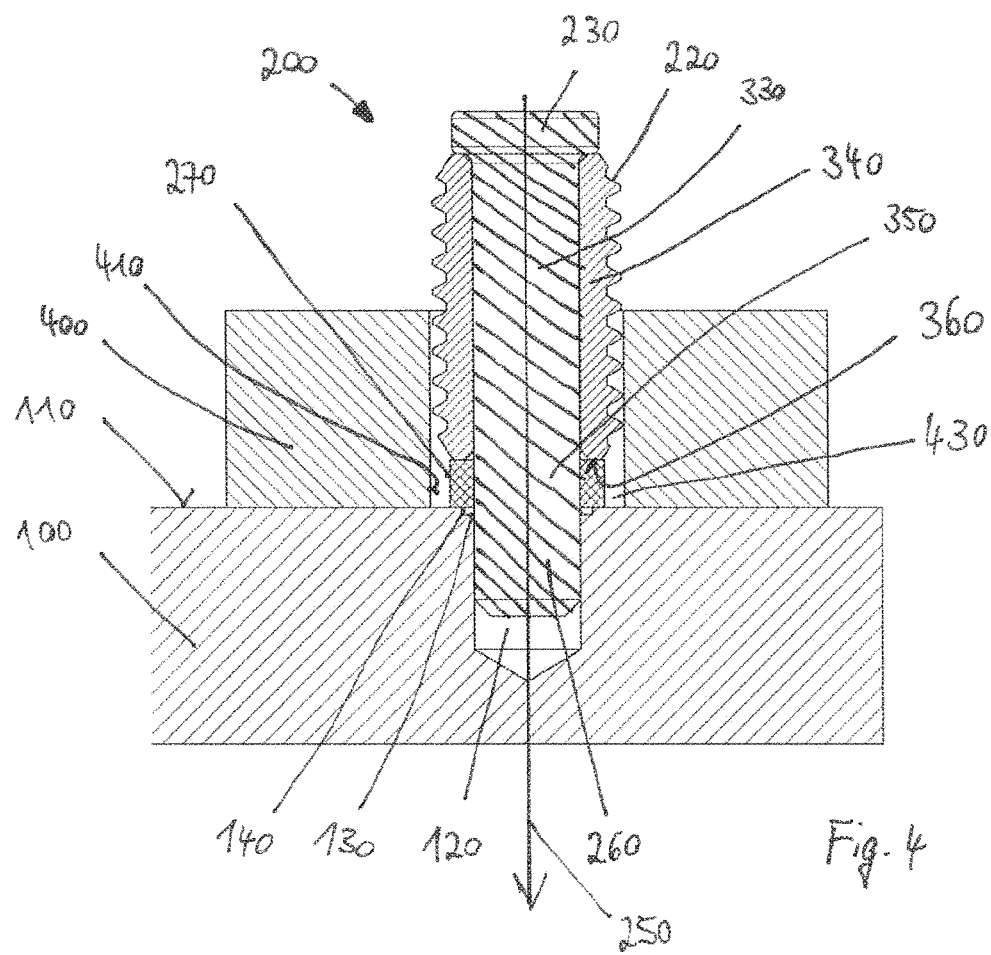
Figure 5:
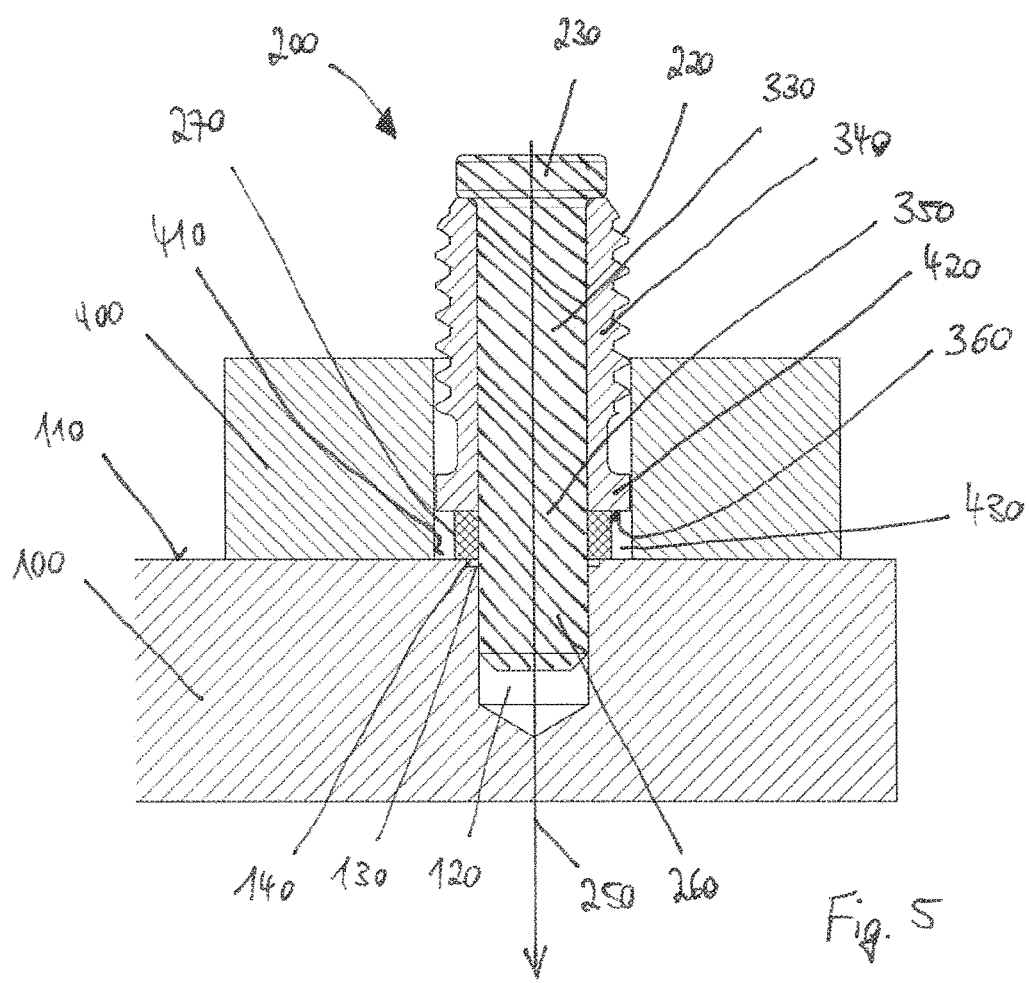

The invention will be described below in detail on the basis of embodiments with reference to the drawings. In the drawing:

FIG. 1 shows a recess,
FIG. 2 shows a fastening device,
FIG. 3 shows a sealing element in cross section,
FIG. 4 shows a fastening device driven into a recess in a longitudinal view, and
FIG. 5 shows a fastening device driven into a recess in a longitudinal view.

DETAILED DESCRIPTION OF THE INVENTION

FIG. 1 shows a plate 100 with a surface 110. The plate 100 consists of a metal or an alloy such as steel. The surface 110 is provided with a paint and/or protection layer, for corrosion protection for example. The plate 100 is provided with a blind hole 120, which was drilled into the plate 100 from the surface 110 with the aid of a step drill. The step of the step drill, which is used as a stop to guarantee a predetermined drilling depth, leaves a depression 140 in the form of an imprint or scratch in the surface 110 at the edge 130 of the blind hole 120, whereby the protective layer can be damaged under certain circumstances. It is therefore desirable to seal the depression 140 together with the blind hole 120 against the environment, more particularly dust-tightly, air-tightly and/or water-tightly. To facilitate this sealing, a step drill with the smallest possible step is used, so that the depression 140 in the radial direction is likewise as narrow as possible.

FIG. 2 shows a fastening device 200 for fastening a first object, not shown, such as a support part or other part to be attached, on a second object, likewise not shown, such as the plate 100 in FIG. 1. The fastening device 200 has a load section 210 with a first load engagement means designed as a thread 220. The fastening device further comprises a head 230 and a driving section 240, which defines a driving direction 250. The driving section 240 has a substantially cylindrical outer surface 260, with which it can be pressed into a blind hole according FIG. 1, for example, in order to fasten the fastening device 200 by frictional engagement in the blind hole. The outer surface 260 is therefore used as a second load engagement means. In examples that are not shown, the driving section is designed in the nature of a nail, a screw, an expander pin or the like. Finally, the fastening device has a sealing element designed as a circumferential sealing ring 270 for sealing between the fastening device 200 and the second object.

FIG. 3 shows the sealing ring 270 enlarged in a cross-sectional view. The sealing ring consists of an elastic material, for example an elastomer, EPDM, neoprene or rubber. The sealing ring has a circular shape with an outside diameter D and an inside diameter d. Each of the two cut faces 280 of the sealing ring 270 that are shown has a rectangular shape. In embodiments that are not shown, the corresponding cut surfaces of the sealing element are oval or elliptical. The cut faces 280 and thus the sealing ring 270 have a width b perpendicular to the driving direction and a height h in the driving direction that is greater than the width b. It is evident from the drawing that the width b corresponds to the difference between the outside diameter D and the inside diameter d. In the present example, the ratio between the height h and the width b is approximately 2, with which good results regarding the sealing function can be achieved at an outer diameter D=8 mm, for example. In embodiments that are not shown, the ratio is larger or smaller than 2. For an outer diameter D=10 mm, a ratio of approximately 1.7 between the height h and the width b has shown good results. For sealing, the sealing ring 270 has a first sealing surface 300 facing opposite the driving direction 250, a second sealing surface 310 facing in the driving direction 250, and a third sealing surface 320 facing radially inward. The first sealing surface 300 and the second sealing surface 310 are flat and are oriented perpendicular to the driving direction 250. The third sealing surface 320 is curved in the shape of a cylindrical surface and is oriented parallel to the driving direction 250. The third sealing surface 320 is therefore suitable for making sealing contact with the cylindrical outer surface 260 of the driving section 240 according to FIG. 2.

FIG. 4 shows a longitudinal section of the fastening device 200 according to FIG. 2 after fastening to the plate 100 according to FIG. 1. The fastening device 200 was driven for this purpose into the blind hole 120 with its driving section 240, for example by one or more blows on the head 230, particularly with the aid of a fastener-setting device that is not shown. The fastening device consists of a pin 330 and a sleeve 340. The pin 330 comprises the head 230 and a continuous shank 350, which bears the sleeve 340 in the load section 210 of the fastening device 200, and forms the cylindrical outer surface 260 in the driving section 240 of the fastening device 200. The sleeve 340 is tightly connected to the shank 350 by means of a press fit and bears the thread 220 on the outer side of the sleeve. In addition, the sleeve 340 has a fourth annular sealing surface 360 facing in the driving direction 250.

To seal the blind hole 120 against the surroundings in order to prevent the ingress of corrosion-promoting moisture, one side of the first sealing surface 300 of the sealing ring 270 contacts the fourth sealing surface 360, and on the other side, the second sealing surface 310 contacts the surface 110 of the plate 100, with the depression 140 at the edge 130 of the blind hole 120 being covered as completely as possible by the second sealing surface 310. In addition, the third sealing surface 320 of the sealing ring 270 contacts the shank 350. For this purpose, the inside diameter d of the sealing ring 270 is less than or equal to an outer diameter of the shank 350. The sleeve 340 has the same geometry at its ends in the driving direction 250 and opposite the driving direction 250, so that the sleeve 340 can be fastened on the pin 330 in both possible orientations.

A part to be attached 400 mounted on the fastening device 200 has a passage opening formed as a bore 410, with which the part to be attached is slipped over the load section 210 of the fastening device 200. The fastening is achieved by a threaded nut, not shown, such as a cap nut, which is screwed onto the thread 220. In an example that is not shown, the bore of the part to be attached has an internal thread and is screwed onto the thread of the fastening device. In order for the part to be attached 400 to come to rest against the surface 110 of the plate 100 without disruption while being pushed onto the fastening device 200, the outside diameter D of the sealing ring 270 is less than or equal to an inside diameter of the bore 410. In order to be able to select as small an inside diameter of the bore 410 as possible, the outside diameter D of the sealing ring 270 is preferably less than or equal to an outside diameter of the thread 220, so that the sealing ring 270 does not protrude radially relative to the thread 220. In embodiments that are not shown, the sealing ring protrudes radially relative to the thread by 15% or 0.5 mm, or by 7.5% or 0.25 mm, or by 3% or 0.1 mm, the outside diameter D of the sealing ring preferably being less than or equal to the inside diameter of the bore.

FIG. 5 shows a longitudinal section of an additional embodiment of a fastening device 200, after it has been fastened to the plate 100 according to FIG. 1, wherein corresponding elements are provided with identical reference numbers. The sleeve 340 in this case has a sealing flange 420 bearing the fourth sealing surface 360. The fourth sealing surface 360 is flat and perpendicular to the driving direction 250. The flange 420, and therefore also the fourth sealing surface 360, additionally extends radially up to a diameter that is equal to or only slightly less than the outer diameter of the thread 220. In this way, a large fourth sealing surface 360 is achieved.

The two embodiments shown according to FIGS. 4 and 5 are presented at a relatively slight driving depth, so that the sealing ring 270 is only compressed slightly in the driving direction 250 and is therefore deformed only slightly, or not at all. Accordingly, a free space 430 radially outside of the sealing ring 270 is formed and has a relatively large volume due to the geometry of the sealing ring 270 according to the invention. With a greater driving depth, the distance between the fourth sealing surface 360 of the fastening device 200 and the surface 110 of the plate 100 is small, so that the sealing ring 270 is compressed further in the driving direction 250 and deformed. Although this makes the free space 430 smaller, the sealing ring 270 also does not protrude radially past the outer diameter of the thread, even for a larger driving depth 220. Therefore a wide tolerance for driving depth is guaranteed without hampering contact of the part to be attached 400 with the surface 110 of the plate 100.

The invention has been described on the basis of examples of a device for fastening a first object to a second object. The features of the described embodiments can also be freely combined with one another within a single fastening device. It should be pointed out that the devices according to the invention are also suitable for other purposes.

The invention claimed is:

1. A device for fastening a first object to a second object, comprising a load section having a thread, a driving section defining a driving direction, and a sealing element, wherein the sealing element has a sealing ring with an outside diameter D that is less than or equal to a largest diameter of the thread, and the sealing element consists of an elastic material and has a width b perpendicular to the driving direction and a height h in the driving direction that is greater than the width b.

2. The device according to claim 1, wherein $h > 1.5 \times b$.

3. The device according to claim 2, wherein $h > 1.8 \times b$.

4. The device according to claim 2, wherein the sealing element has a circular sealing ring with the outside diameter D and an inside diameter d, where $b = (D-d)/2$.

5. The device according to claim 2, wherein a cross-sectional surface of the sealing element is rectangular.

6. The device according to claim 1, wherein the sealing element has a circular sealing ring with the outside diameter D and an inside diameter d, where $b = (D-d)/2$.

7. The device according to claim 6, wherein the inside diameter d is less than or equal to a largest diameter of the driving section.

8. The device according to claim 6, wherein a cross-sectional surface of the sealing element is rectangular.

9. The device according to claim 1, wherein a cross-sectional surface of the sealing element is rectangular.

10. The device according to claim 1, wherein a cross-sectional surface of the sealing element is oval or elliptical.

11. The device according to claim 1, comprising a sealing surface pointing in the driving direction.

12. The device according to claim 11, comprising a sealing flange comprising the sealing surface.

13. The device according to claim 1, wherein the load section comprises a shank and a sleeve that comprises the thread.

14. The device according to claim 13, wherein the sleeve comprises a sealing surface pointing in the driving direction.

15. A device comprising the device of claim 1, wherein the driving section comprises a shank.

16. A device comprising the device of claim 1, wherein the driving section comprises a screw thread.

17. The device according to claim 1, wherein the driving section comprises an expansion sleeve and an expanding mandrel.

18. The device according to claim 1, wherein the elastic material consists of any of an elastomer, EPDM, neoprene, or rubber.

* * * * *